July 7, 1942. A. B. ST. HILAIRE Re. 22,128
METHOD OF AND APPARATUS FOR MANUFACTURING PHONOGRAPHIC DISKS
Original Filed Nov. 23, 1934
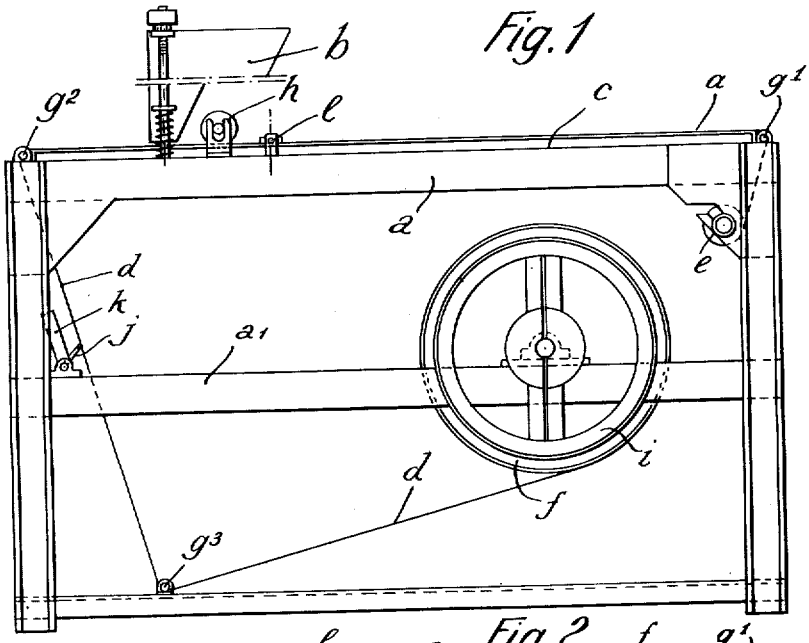
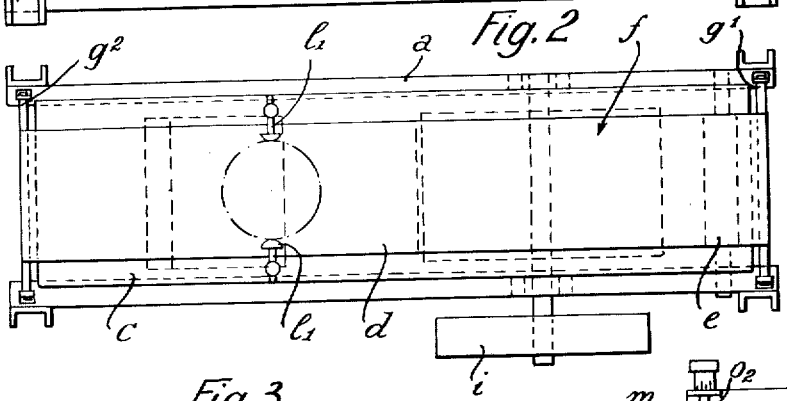
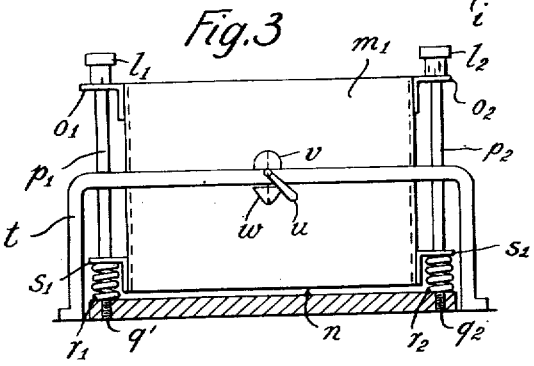
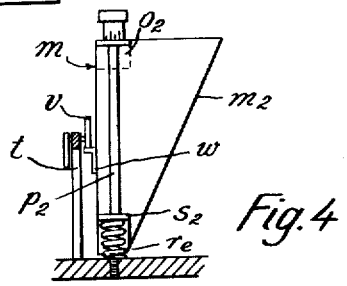
INVENTOR
ALBERT B. ST. HILAIRE
BY
Fennie, Fairbairn, Marvin & Edmonds
ATTORNEYS Reissued July 7, 1942 Re. 22,128

UNITED STATES PATENT OFFICE 22,128

METHOD OF AND APPARATUS FOR MANUFACTURING PHONOGRAPHIC DISKS

Albert B. St. Hilaire, Creteil, France, assignor to Societe des Vernis Pyrolac S. A. R. L., Creteil, France Original No. 2,079,972, dated May 11, 1937, Serial No. 754,471, November 23, 1934. Application for reissue December 30, 1938, Serial No. 248,649. In France November 28, 1933

12 Claims. (Cl. 117—111)

The object of the present invention is to provide a method and apparatus for the manufacture of phonographic disks, and in a general way of supports of any kind whatever, either decorated or not and coated with a layer of a varnish of the nitro-cellulose or aceto-cellulose kind, or with other products.

According to the present invention, the disks of cardboard, strong paper, or any other suitable matter, cut to the desired size, are disposed on an endless band of paper or a conveyer band, in such manner as to pass under a hopper for the distribution of the coating product. These disks are then collected in any suitable manner and the band of paper or conveyer belt passes close to a scraping plate, which recuperates the excess of varnish, which drops into a suitable receiver, the band or belt moving further, either for being wound around a drum of large diameter, or for coming again under the feed hopper after having passed between two driving rollers, in the case of an endless paper band.

In a particular embodiment of the invention, the accurate positioning of the disks on the band or belt is obtained, just before said disks pass under the feed hopper, by means of guiding members adjustable in accordance with the size of the disks.

A preferred embodiment of the present invention will be hereinafter described, with reference to the accompanying drawing, given merely by way of example, and in which:

Fig. 1 is a vertical elevational view of a machine according to the present invention;

Fig. 2 is a corresponding plan view;

Fig. 3 is a vertical end view of the feed hopper of the machine;

Fig. 4 is a vertical elevational view corresponding to Fig. 3.

The frame *a* of the machine shown in the drawing supports, at its upper part, a feed hopper *b* filled with varnish and the height of which with respect to plate *c* can be adjusted as it will be hereinafter explained. A band of paper *d* moves with respect to said frame. This band of paper is, on the one hand, wound around a drum *e* of relatively small diameter, which serves to distribute the paper band, and, on the other hand, wound around a drum *f* intended to receive the band of paper after the latter has been used. This drum *f* is of relatively large diameter so as to avoid differences in the linear velocity of band *d* as it is being wound around said drum *f*. The movement of said drum *f* is imparted thereto through a pulley *i* concentric with drum *f*, said pulley *i* being itself driven by an electric motor through a speed reducing gear.

Band *d* passes, at $g^1$, $g^2$ and $g^3$, around rollers or glass rods, so as to avoid, as far as possible, important frictional resistances.

On the cross members $a^1$ of frame *a*, there is pivotally mounted a scraping plate *j* bearing against the band of paper *d*, as shown by Fig. 1, the pivoting of plate *j* being controlled through a handle or lever *k* rigid with said plate.

On plate *c* there are provided two guiding members *l*, the distance between which is adjustable, owing to the provision of screws, eventually micrometric screws, movable in their supports $l^1$. These guiding members ensure the accurate positioning of the disks on band *d* immediately before they come under feed hopper *b*, and as the conveyer band is of greater width than the disks to which the coating material is to be applied, the coating material from the hopper will be applied both to the disks and to the conveyer band so that the disks are embedded in the coating material on the band. Above the frame there is provided any suitable device for distributing on the band the disks or plates to be varnished, so as to permit an automatic working of the machine. There is further provided a roller *h* intended to ensure the perfect adhesion of the disks to the band and therefore their perfect engagement under the hopper. The system of rollers *e* and *f* for the unwinding and the winding of the band of paper might be replaced by a similar system of rollers, but of equal dimensions for instance, band *d* being then an endless band.

In a particular embodiment of the invention, illustrated by Figs. 3 and 4, the hopper *b* comprises two plates $m^1$ and $m^2$, which may be either inclined or not with respect to each other, so as to leave between them a gap or slot *n* at right angles to the direction of travel of the band. The width of said slot *n* is adjusted in accordance with the nature and viscosity of the coating product to be fed by said hopper, through said slot, onto the disks or other supports above referred to. Thus, the bottom of the outlet of the hopper can be positioned above the conveyer band a distance equal to the thickness of the articles to be coated plus the desired thickness of coating thereon so that as the disks pass beneath the hopper the outlet therefrom will act as a scraper or doctor blade to regulate the thickness of the coating applied to the articles. The hopper is provided at its upper part with two angle-irons $o^1$ and $o^2$ provided with holes adapted to accommodate threaded rods $p^1$ and $p^2$ which are screwed in plate $c$ at $q^1$ and $q^2$. Springs $r^1$ and $r^2$, concentric with rods $p^1$ and $p^2$, and interposed between plate $c$ of the frame and angle irons $s^1$ and $s^2$ rigidly carried by the hopper, keep said hopper at a well determined height above said plate $c$, said height being adjustable by means of micrometric screws $l^1$ and $l^2$ provided above angle irons $o^1$ and $o^2$, which angle irons are therefore provided with marks adapted to cooperate with said micrometric devices.

On the other hand there is provided a bridge-shaped member $t$ carried by the frame and on which is mounted a handle $u$ adapted to control a cam or eccentric $v$ cooperating with angle iron $w$ rigid with the hopper.

It is therefore possible, by operating said handle $u$, to cause angle iron $w$, and therefore the feed hopper, to move downwardly so that it is applied against the support and prevents the liquid present in the hopper from flowing out when the machine ceases to work.

As the band $d$ passes around the roller $g^2$ the disks which are embedded in the coating material on the band are removed, and as soon as the coating material thereon has dried, the record may be traced in the dried coating material. Consequently the invention is concerned with the application of the method of obtaining plates coated with varnish as above explained to the manufacture of phonographic disks, either by direct recording or through the action of a die, or through electro-plating means.

Of course the invention is not to be considered as limited to the embodiment above described, and for instance the structure of the feed hopper, the means for winding and unwinding band $d$, the means for operating scraping band $j$, and also the shape of the frame and the means for driving the paper band are not necessarily of the specific structure above described.

It is also obvious that, according to the thickness of the layer of varnish with which the disk or plate is to be coated on one face or on both faces, I may vary the viscosity of the products contained in the feed hopper and the height of the bottom of said hopper above the plates or disks, and also the speed of unwinding of the paper band, provided that it remains uniform for a given series of plates or disks.

While I have, in the above description, disclosed what I deem to be a practical and efficient embodiment of the present invention, it should be well understood that I do not wish to be limited thereto as there might be changes made in the arrangement, disposition and form of the parts without departing from the principle of the present invention as comprehended within the scope of the appended claims.

What I claim is:

1. A machine for applying a varnish on disks which comprises, in combination, a frame, a conveyer band of paper movable in said frame and adapted to carry said disks, guiding means for said band of paper for causing a portion thereof, carrying the disks, to slide in its own plane along a horizontal straight path of travel, a drum carrying one end of said band of paper wound thereon, another drum of larger diameter for the winding of the other end of the band of paper thereon, driving means for rotating said second mentioned drum about its axis, a hopper for said varnish carried by said frame above said band provided with a slot in its bottom extending parallelly to said plane in a direction at right angles to said path of travel so as to distribute said varnish over said band and the disks that are carried thereon, a plate pivotally mounted in said frame so as to be able to be brought into or out of contact with the upper face of the portion of the band of paper extending between said hopper and the second mentioned drum, so that said plate can scrape the excess of varnish on said band, and means for controlling the position of said plate with respect to said band.

2. A machine for applying a varnish on disks which comprises, in combination, a frame, a conveyer band of paper movable in said frame and adapted to carry said disks, guiding means for said band of paper for causing a portion thereof, carrying the disks, to slide in its own plane along a horizontal straight path of travel, a drum carrying one end of said band of paper wound thereon, another drum of larger diameter for the winding of the other end of the band of paper thereon, driving means for rotating said second mentioned drum about its axis, two members carried by said frame in an adjustable manner close above said horizontal portion of the band of paper, for accurately determining the position of the disks thereon in a direction at right angles to said path of travel, a hopper for said varnish carried by said frame above said band behind said members, with reference to the direction of travel thereof, said hopper being provided with a slot in its bottom extending parallelly to said plane in a direction at right angles to said path of travel so as to distribute said varnish over said band and the disks that are carried thereon, and means for scraping the upper face of said conveyer band after its passage under said hopper.

3. A machine for applying a varnish on disks, which comprises, in combination, a frame, a conveyer band of paper movable on said frame adapted to carry said disks, guiding means for said band of paper for causing a portion thereof, carrying the disks, to slide in its own plane along a horizontal straight path of travel, a drum carrying one end of said band of paper wound thereon, another drum of larger diameter for winding of the other end of said band of paper thereon, driving means for rotating said second mentioned drum, a hopper for said varnish carried by said frame above said horizontal portion of the band, having its bottom at a small distance above said portion of the band, said bottom being provided with a slot-shaped aperture, parallel to said plane and at right angles to said path of travel, for discharging said varnish in the form of a thin sheet onto said band and the disks carried by it, and means for scraping said conveyer band after its passage under said hopper.

4. In apparatus for manufacturing phonographic disks, the improvement in a coating machine comprising a flat table, a feed hopper adjustably supported above the top of the table, means for passing a disk-carrying band horizontally across the top of the table and under the hopper, and means associated with the hopper and the table for dropping the feed opening portion of the hopper onto the table to prevent the coating liquid present in the hopper from flowing out when the machine ceases to work and in which the latter means comprise a bridge-shaped member carried by the table, a lateral support attached to the side of the hopper, a shaft supported by the bridge near said lateral support, an eccentric cam mounted on the inner end of the shaft, and a handle mounted on the outer end of the shaft so that the cam may be moved in sliding contact with said lateral support to drop the hopper onto the table.

5. Apparatus for applying a coating to phonographic disks and the like comprising a frame having a flat portion, a conveyor of greater width than the articles to be coated for conveying articles to be coated over the flat portion of the frame, means for advancing the conveyor over said flat portion of the frame, coating-material-supply means positioned above said conveyor having an outlet transverse to the direction of movement of the conveyor of greater width than the articles to be coated, so that the coating material from the outlet is applied both to the articles and the conveyor, the bottom of the outlet being positioned above the conveyor a distance equal to the thickness of the articles to be coated plus the desired thickness of coating thereon, whereby the outlet acts as a scraper or doctor blade to regulate the thickness of the coating applied to the articles as they are carried from beneath the body of coating material.

6. Apparatus for applying a coating to phonographic disks and the like comprising a frame having a flat portion, a conveyor band of greater width than the articles to be coated for conveying the articles to be coated over the flat portion of the frame, a drum having one end of said band wound thereon, a second drum for the winding of the other end of the band thereon, driving means for rotating said second drum about its axis, coating-material-supply means positioned over the flat portion of the frame and above the conveyor band having an outlet transverse to the direction of movement of the conveyor band of greater width than the articles to be coated, so that the coating material from the outlet is applied both to the articles and the conveyor band, the bottom of the outlet being positioned above the conveyor band a distance equal to the thickness of the articles to be coated plus the desired thickness of coating thereon, whereby the outlet acts as a scraper or doctor blade to regulate the thickness of the coating applied to the articles as they are carried from beneath the coating-material-supply means, a plate pivotally mounted on the frame and adapted to be placed into or out of contact with the coating-material-receiving face of the portion of the band extending between said coating-material-supply means and the second drum, so that when in contact with the band it can scrape excess coating material therefrom, and means for controlling the position of the plate with respect to the band.

7. Apparatus for applying a coating to phonographic disks and the like comprising a frame having a flat generally horizontal portion, a conveyor band of paper of greater width than the articles to be coated for conveying the articles to be coated, means for guiding the conveyor band and causing a portion thereof and articles carried thereby to move over the flat portion of the frame, a drum having one end of said band wound thereon, a second drum for the winding of the other end of the band thereon, driving means for rotating said second drum about its axis, a pair of members, one adjacent each side of the conveyor as it passes over the flat portion of the frame for accurately determining the position of articles on the conveyor transversely thereof, a hopper for coating material positioned above the generally flat portion of the frame and the conveyor band as it passes thereover, said hopper having an outlet slot transverse to the direction of movement of the conveyor band of greater width than the articles to be coated, so that the coating material passing out of said slot is applied both to the articles and the conveyor band, the slot in said hopper being positioned above the conveyor band a distance equal to the thickness of the articles to be coated plus the desired thickness of coating thereon, whereby the edge of the slot acts as a scraper or doctor blade to regulate the thickness of the coating applied to the articles as they are carried from beneath the hopper, and means for scraping excess coating material from the face of the conveyor band to which the coating material is applied after the band has passed from beneath the hopper.

8. Apparatus for applying a coating to phonographic disks and the like comprising a frame having a flat portion, an imperforate conveyor band of greater width than articles to be coated for conveying the articles to be coated over the flat portion of the frame, means for advancing the conveyor band over said flat portion of the frame, a hopper for coating material adjustably supported above the flat portion of the frame, said hopper having an outlet transverse to the direction of movement of the conveyor band of greater width than the articles to be coated, so that the coating material from the outlet is applied both to the articles and the conveyor band, the bottom of the outlet being positioned above the conveyor band a distance equal to the thickness of the articles to be coated plus the desired thickness of coating thereon, whereby the outlet acts as a scraper or doctor blade to regulate the thickness of the coating applied to the articles as they are carried from beneath the hopper, means associated with the hopper and the frame for obtaining an accurate adjustment of the gap between the bottom of the feed hopper and the flat portion of the frame, means for removing coating material from the band after the coated articles have been taken therefrom, and means associated with the hopper and the frame for dropping the hopper onto the frame to prevent the coating material in the hopper from flowing through said outlet when the apparatus is not operating.

9. Apparatus for applying a coating to phonographic disks and the like comprising a frame having a generally horizontal flat portion, a conveyor of greater width than the articles to be coated for conveying the articles to be coated over the flat portion of the frame, means for advancing the conveyor over said flat portion of the frame, a hopper for coating material positioned above said conveyor having an outlet transverse to the direction of movement of the conveyor of greater width than the articles to be coated, so that the coating material from the outlet is applied both to the articles and the conveyor, the bottom of the outlet being positioned above the conveyor a distance equal to the thickness of the articles to be coated plus the desired thickness of coating thereon, whereby the outlet acts as a scraper or doctor blade to regulate the thickness of the coating applied to the articles as they are carried from beneath the hopper, means associated with the hopper and frame for obtaining an accurate adjustment of the gap between the bottom of the hopper and the conveyor as it passes over the flat portion of the frame, and means associated with the hopper and frame for dropping the portion of the hopper having the outlet onto the table to prevent coating material in the hopper from flowing through the outlet when the apparatus is not operating.

10. Apparatus for applying a coating to phonographic disks and the like comprising a frame having a generally horizontal flat portion, a conveyor band of greater width than the articles to be coated for conveying articles to be coated over the flat portion of the frame, means for advancing the conveyor band over said flat portion of the frame, a hopper for coating material positioned above said conveyor band and having an outlet transverse to the direction of movement of the conveyor band of greater width than the articles to be coated so that the coating material from the outlet is applied both to the articles and the conveyor, the bottom of the outlet being positioned above the conveyor band a distance equal to the thickness of the articles to be coated plus the desired thickness of coating thereon, whereby the outlet acts as a scraper or doctor blade to regulate the thickness of the coating applied to the articles as they are carried from beneath the hopper, and means associated with the hopper and the frame for dropping the outlet portion of the hopper onto the flat portion of the frame to prevent coating material in the hopper from flowing out when the apparatus is not operating.

11. Apparatus for applying a coating to phonographic disks and the like comprising a frame having a flat portion, a conveyor of greater width than the articles to be coated for conveying articles to be coated over the flat portion of the frame, means for advancing the conveyor over said flat portion of the frame, a coating-material-supply hopper positioned above said conveyor having an outlet transverse to the direction of movement of the conveyor of greater width than the articles to be coated, so that the coating material from the outlet is applied both to the articles and the conveyor, and means associated with the hopper and the frame for dropping the hopper onto the frame to prevent the coating material in the hopper from flowing through said outlet when the apparatus is not operating.

12. The method of applying coatings to phonographic disks and the like, which comprises maintaining a body of hardenable, relatively viscous, liquid coating material above a support, conveying the articles to be coated across the support and beneath and in contact with the bottom of the coating material, the body of coating material with which the articles contact being substantially wide in the direction of travel of the articles, and wider normal to the direction of travel of the articles than the articles, so that a portion of the coating material will be applied to the articles and beyond the sides of the articles, restraining movement of the body of coating material, in the direction of travel of the articles, above the desired thickness of coating, as the articles pass from beneath said body of material to thereby regulate the thickness of coating applied to the articles, and separating the articles from the material applied beyond the sides thereof.

ALBERT B. ST. HILAIRE.